(12) United States Patent
Bourderionnet et al.

(10) Patent No.: US 11,283,168 B2
(45) Date of Patent: Mar. 22, 2022

(54) DEVICE FOR OPTICALLY RECEIVING A SIGNAL COMING FROM A PHASED ANTENNA ARRAY AND ASSOCIATED ANTENNA SYSTEM

(71) Applicant: THALES, Courbevoie (FR)

(72) Inventors: Jérome Bourderionnet, Palaiseau (FR); Gilles Feugnet, Palaiseau (FR); Arnaud Brignon, Palaiseau (FR)

(73) Assignee: THALES, Courbevoie (FR)

( * ) Notice: Subject to any disclaimer, the term of this patent is extended or adjusted under 35 U.S.C. 154(b) by 144 days.

(21) Appl. No.: 16/636,831

(22) PCT Filed: Aug. 7, 2018

(86) PCT No.: PCT/EP2018/071339
§ 371 (c)(1),
(2) Date: Feb. 5, 2020

(87) PCT Pub. No.: WO2019/030204
PCT Pub. Date: Feb. 14, 2019

(65) Prior Publication Data
US 2020/0365988 A1    Nov. 19, 2020

(30) Foreign Application Priority Data
Aug. 8, 2017    (FR) ...................................... 17 00843

(51) Int. Cl.
*H01Q 3/26* (2006.01)
*H04B 10/2575* (2013.01)

(52) U.S. Cl.
CPC ....... *H01Q 3/2676* (2013.01); *H04B 10/2575* (2013.01)

(58) Field of Classification Search
None
See application file for complete search history.

(56) References Cited

U.S. PATENT DOCUMENTS

| 4,725,844 A | * | 2/1988 | Goodwin | ............. H01Q 3/2676 342/374 |
| 4,736,463 A | * | 4/1988 | Chavez | .................... H01Q 3/34 359/107 |

(Continued)

FOREIGN PATENT DOCUMENTS

WO    WO 03/079101 A1    9/2003

OTHER PUBLICATIONS

French Office Action, from the French Patent Office in counterpart French Application No. 1700843, dated Jul. 3, 2018.
(Continued)

*Primary Examiner* — David W Lambert
(74) *Attorney, Agent, or Firm* — Arent Fox LLP

(57) ABSTRACT

The invention relates to an optical reception device for receiving a signal from an antenna array comprising:
  a light source generating an optical carrier and M phased optical beams which are frequency-shifted relative to the optical carrier;
  a collection circuit comprising N paths connected to an antenna, and comprising a modulator of an incident signal;
  a beam-forming network connecting (M+1) first ports to N second ports connected to one path, M first ports being connected to the optical beams and a control port connected to the other ports so that a maximum optical intensity on the control port corresponds to phased signals on the N second ports.

11 Claims, 3 Drawing Sheets

(56) References Cited

U.S. PATENT DOCUMENTS

Figure 1:
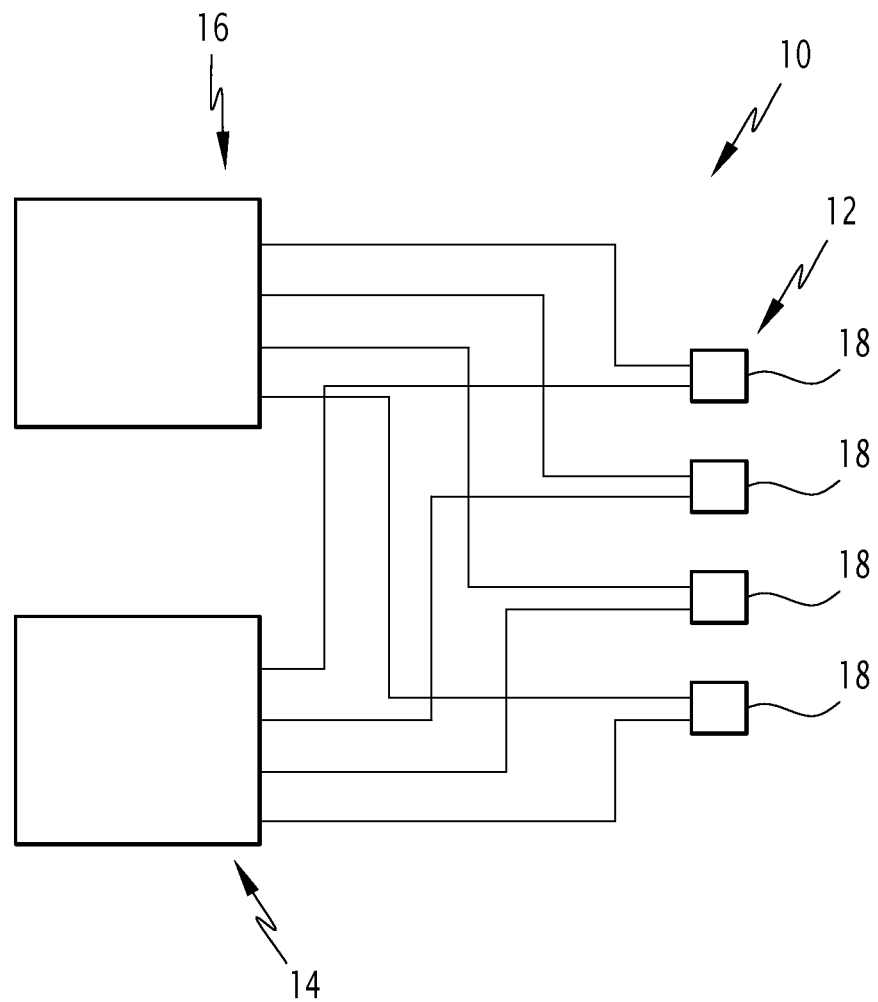

| | | | |
|---|---|---|---|
| 2012/0162011 A1* | 6/2012 | Le Grange | H01Q 3/22 |
| | | | 342/375 |
| 2014/0320345 A1 | 10/2014 | Caille et al. | |
| 2014/0320346 A1* | 10/2014 | Caille | G02B 6/28 |
| | | | 342/375 |
| 2017/0063461 A1* | 3/2017 | Prucnal | H04B 10/25752 |
| 2018/0062261 A1* | 3/2018 | Puleri | H01Q 3/2676 |

OTHER PUBLICATIONS

International Search Report, issued by International Searching Authority in corresponding International Application No. PCT/EP2018/071339, dated Oct. 16, 2018.

* cited by examiner

DEVICE FOR OPTICALLY RECEIVING A SIGNAL COMING FROM A PHASED ANTENNA ARRAY AND ASSOCIATED ANTENNA SYSTEM

CROSS-REFERENCE TO RELATED APPLICATIONS

This application is a National Stage Entry of International Patent Application No. PCT/EP2018/071339, filed on Aug. 7, 2018, which claims priority to French Application No. 17 00843, filed on Aug. 8, 2017. The disclosures of the priority applications are incorporated in their entirety herein by reference.

The present invention relates to an optical transceiver device, the device being able to send or receive a signal coming from a phased antenna array. The present invention also relates to an antenna system including such a device.

A phased antenna array is a group of elementary antennas supplied with radiofrequency signals whose phase is adjusted so as to obtain the desired radiation pattern. Such an antenna array is in particular used in the field of radars or telecommunications.

For both of the preceding applications, it is desirable to increase the capacities of the antenna array so as for example to allow the radar to be able to track several targets at once. To that end, it is known for each elementary antenna of the phased antenna array to be capable of emitting several radiofrequency beams each corresponding to a specific telecommunication channel.

To that end, it is known to perform space-division multiplexing directly in the radiofrequency domain. In such a case, beamforming circuits are used including radiofrequency delay lines, radiofrequency power distributors and radiofrequency directional couplers. By selecting the length of the delay lines, the phase shifts are obtained allowing the desired sweeping for the antenna array. Similarly, the power distribution ratios controlled by the radiofrequency power distributors make it possible to control the opening amplitude distribution. In order to obtain such an operation, said arrangements of delay lines and directional couplers are known as the Blass, Butler or Nolen arrangements.

A signal applied at the input of a power line thus crosses the line by passing through a plurality of intersection points up to one end of the power line. At each point of intersection, a part of the signal is coupled via the directional coupler in the corresponding control line to control the associated elementary antenna. The difference in length between the input and each point of intersection makes it possible to control the direction of the beam emitted by the elementary antenna. The emission diagram is controlled by the coupling coefficients of each directional coupler. However, to avoid the stray reflections at the ends of each line, adaptation charges are coupled to each control line and to each supply line at the ends. The design of the array consists of selecting the appropriate delay and coupling values to obtain the desired beam.

However, when the delays (the length of the delay lines) and the coupling coefficients are defined, the emission pattern is frozen. Furthermore, in practice, the range of available coupling coefficient values is limited, which limits the number of accessible emission patterns.

The transposition of the same idea in the optical field, called optical beam formation array, has been subject to many studies. Indeed, the use of optical connections makes it possible to reduce the losses of electrical cables or radiofrequency electrical circuits of several orders of magnitude.

The studies done have related to optical configurations in volume or on photonic integrated circuits. Photonic integrated circuits are also referred to using the acronym PIC and make it possible to obtain implementations having an improved compactness.

In each of the cases, similarly to the embodiment version with space-division multiplexing directly in the radiofrequency field, the optical beam formation array is provided with M input ports and N output ports and includes a combination of delay lines or optical phase shifters, optical directional couplers in order to distribute the optical powers. The light injected into an input port is separated and reoriented toward the N optical output ports with a phase or delay and amplitude specific to the considered optical output port. Thus, on each output port, several optical beams are superimposed with different frequencies, phases and specific radiofrequency information. The complex optical output beam is detected by a photodiode that supplies an elementary antenna associated with the photodiode.

The delays are obtained by optical fibers wound in the optical configurations in volume and by spirals in the case of photonic integrated circuits. Thus, similarly to the case of an embodiment of space-division multiplexing directly in the radiofrequency domain, when the delays (the length of the delay lines) or the phases and the coupling coefficients are defined, the emission pattern is frozen.

In order to obtain an emission pattern that is at least partially adjustable, it is known to use optical ring resonators to produce adjustable optical delay lines. To that end, the fact is used that when an optical carrier is modulated using a radiofrequency signal and propagates through an optical waveguide, the actual propagation time of the radiofrequency signal is determined by the group delay of the optical waveguide. The group delay is the derivative of the phase response of the optical waveguide. To use such a property, the frequencies of the optical beams should be adapted to the resonance frequencies of the resonators. This makes the entire system fairly complex to implement and control.

The use of delay lines, for example optical ring resonators, also makes it possible to obtain an antenna array not having any "squinting" phenomenon. Such a phenomenon corresponds to the fact that the pointing direction can vary as a function of the radiofrequency frequency. This property is in particular useful for broadband applications since, in the case where the bandwidth is reduced, adjustable phase shifters are usable to obtain a simpler assembly.

The examples of such transpositions in the optical field have several limitations.

On the one hand, since the channels have central frequencies in ranges of several tens of GigaHertz, the electronic drivers involved are relatively expensive and complicated to implements since several frequency multiplication stages are used.

On the other hand, the radiofrequency phase shift is obtained by controlling the optical phase between the optical carrier and one of the optical side bands obtained after modulation (single band modulation diagram). The control of the optical phase being critical, the photodiodes and the array for forming an optical beam are usually integrated on the same medium (for example, a PIC). This in practice prevents the receivers from being able to be positioned far away from the antennas, which limits the interest thereof. There is therefore a need for an optical device making it possible to manage a phased antenna array that makes it possible to place the antenna array at a distance from the optical device.

To that end, the disclosure proposes an optical reception device, the reception device being able to receive a signal from a phased antenna array, the phased antenna array including N elementary antennas, N being an integer greater than 1, the reception device including a light source capable of generating an optical carrier at a reference frequency and M phased optical beams relative to a replica of the optical carrier and which are frequency-shifted relative to the reference frequency, M being an integer greater than 1. The device includes a collection circuit for the signals from the N elementary antennas, the collection circuit including N paths each connected to a respective elementary antenna, each path including a modulator able to modulate at least one of the phase and the amplitude of an incident signal according to a modulation. The device includes a beam-forming network connecting M+1 first ports to N second ports, each second port being connected to a respective path of the N paths, M first ports of the M+1 first ports being connected respectively to one of the M optical beams and the first port not connected to one of the M optical beams being a control port, the control port being connected to the other ports so that a maximum optical intensity on the control port corresponds to phased signals on the N second ports. The device includes a photodiode connected to the control port and able to measure the optical intensity of the signal of the control port at the reference frequency, and a controller able to control the modulation of each modulator as a function of the optical intensity measured by the photodiode.

According to specific embodiments, the optical reception device comprises one or more of the following features, considered alone or according to any technically possible combinations:

- the collection circuit includes two additional paths, one of the paths being supplied by the optical carrier and the other paths supplying the light source with a replica of the optical carrier.
- the controller is able to control the modulation of each modulator as a function of the optical intensity measured by the photodiode using a technique chosen from the group made up of the gradient descent algorithm, the Nelder-Mead algorithm, a frequency marking technique or the like.
- the beam-forming network is a Blass matrix or a Butler matrix or a Nolan matrix.
- the collection circuit includes multi-core fibers.
- each path of the collection circuit includes an optical filter able to eliminate a side band.
- the light source includes two phase-locked lasers.
- the receiving device includes a first part including the light source and the photodiode and a second part including the beam-forming network, the first part being made from InP and the second part being made from SiN or substrate-on-insulator.

The present disclosure also relates to an antenna system including a phased antenna array, the phased antenna array including N elementary antennas, N being an integer greater than 1, a reception device as previously disclosed.

According to one specific embodiment, the antenna system further includes an optical emission device for controlling the phased antenna array, the emission device including a light source able to generate an optical carrier at a reference frequency and M phased optical beams relative to a replica of the optical carrier and frequency-shifted relative to the reference frequency, M being an integer greater than 1. The emission device includes a beam-forming network connecting M first ports to N second ports, each first port respectively being connected to one of the M optical beams generated by the light source and each second port being able to generate a control signal of one of the N elementary antennas.

According to one specific embodiment, the light source of the emission device comprises two emission sub-sources each emitting a light wave with a first frequency gap, the light source of the reception device comprising two reception sub-sources each emitting a light wave with a second frequency gap, the first and the second frequency gaps being identical.

Figure 2:
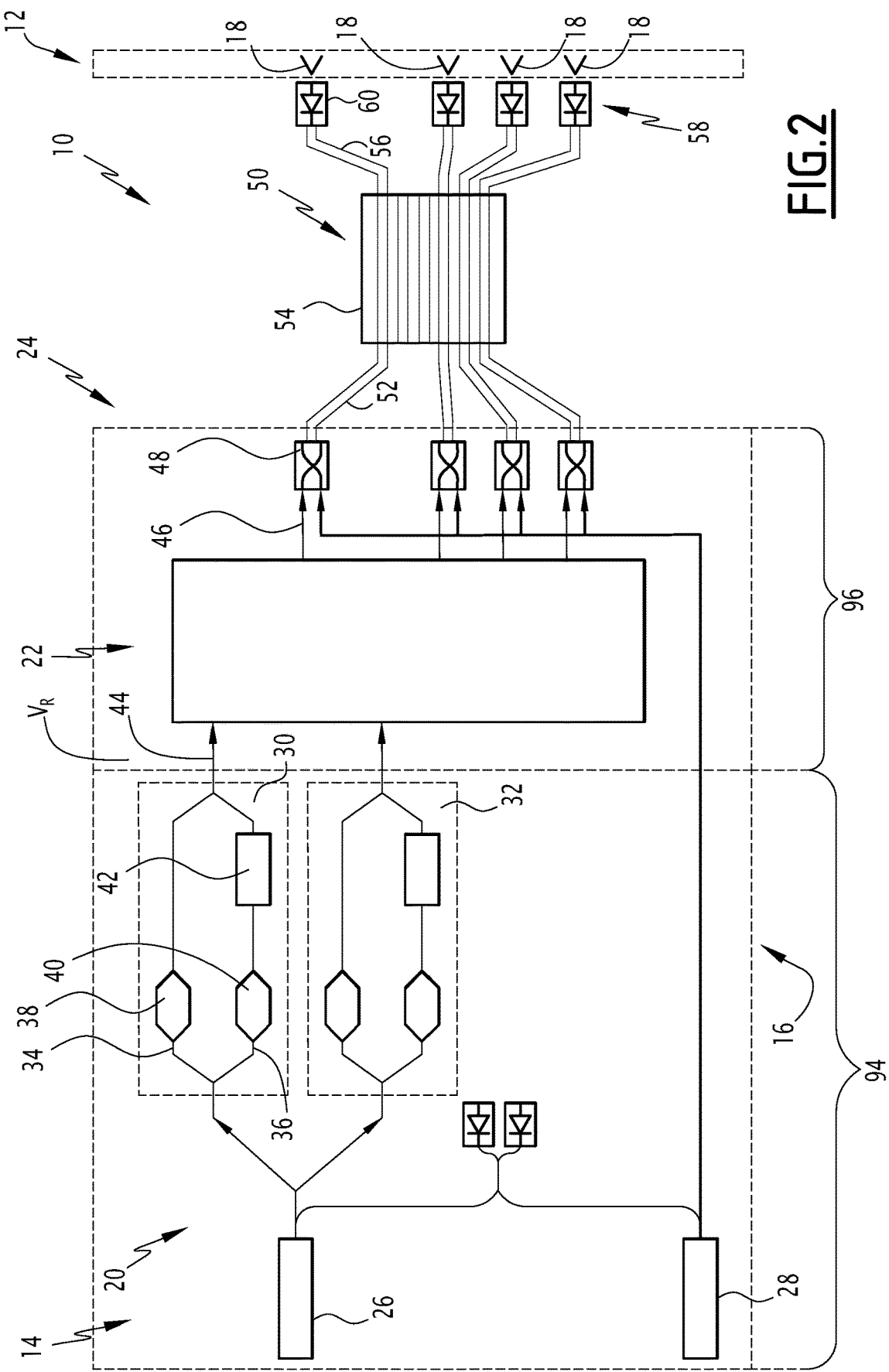
Figure 3:
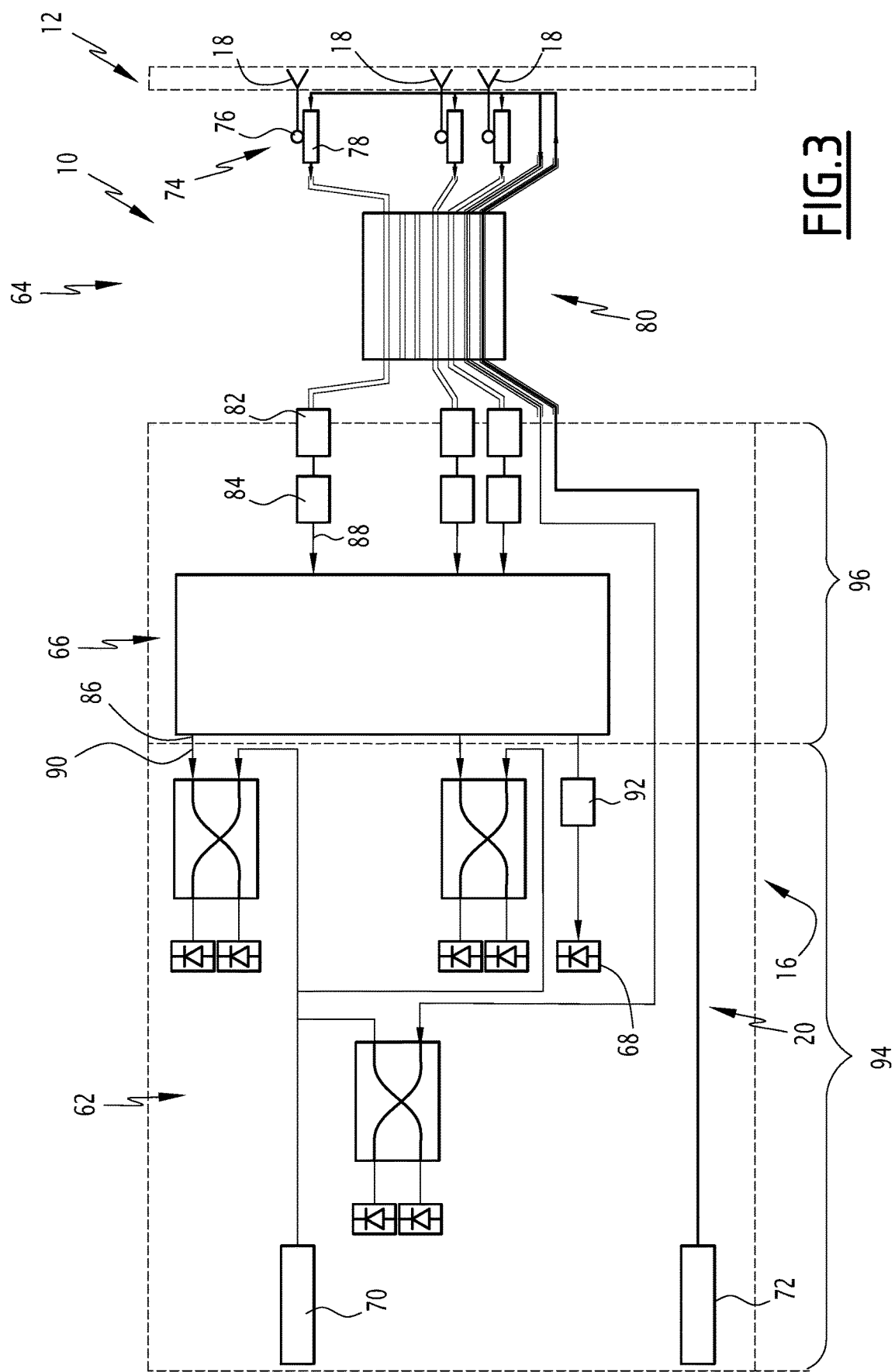

Other features and advantages of the invention will appear upon reading the following description of embodiments of the invention, provided as an example only and in reference to the drawings, which are:

FIG. 1, an illustration of an antenna system including an antenna array, an optical emission device and an optical reception device, FIG. 2, a schematic view of the optical emission device of FIG. 1, and FIG. 3, a schematic view of the optical reception device of FIG. 1.

FIG. 1 illustrates an antenna system 10 including an antenna array 12, an optical emission device 14 and an optical reception device 16.

The antenna array 12 is a phased antenna array.

The antenna array 12 includes N elementary antennas 18, N being an integer greater than 1. In the illustrated example, the integer N is equal to 4.

The optical emission device 14 is able to control the phased antenna array 12 so that the antenna array 12 emits a desired beam.

An exemplary emission device 14 is in particular illustrated in FIG. 2.

The emission device 14 includes a light source 20 called emission light source 20, a beam-forming network 22 called emission beam-forming network 22 and a transmission circuit 24.

The emission light source 20 is able to generate an optical carrier at a reference frequency and M phased optical beams relative to a replica of the optical carrier and frequency-shifted relative to the reference frequency. M is an integer greater than 1.

In the illustrated example, the integer M is equal to 2.

According to the proposed example, the emission light source 20 includes two phase-locked lasers 26, 28 (also called emission sub-sources) and single-sideband suppression-carrier modulators 30, 32.

In the example of FIG. 2, each laser 26, 28 is a distributed feedback (DFB) laser. Such a laser is a laser using a Bragg array that makes it possible to choose the emission wavelength.

One of the two DFB lasers 28 is able to generate the optical carrier at the reference frequency $v_0$.

The other DFB laser 26 is able to generate a wave at the frequency $v_1$ and is connected with the single-sideband suppression-carrier modulators.

More specifically, the light source 20 includes a unique carrier-suppressed single sideband modulator 30, 32 for each of the M beams.

A single-sideband suppression-carrier modulator is also designated by the acronym SSB-SCM.

In a simplified manner, such a modulator 30, 32 includes two arms 34 and 36, the first arm 34 including a modulator of type I 38 supplied by a radiofrequency signal RF and the second arm 36 including a modulator of type Q 40 supplied by the radiofrequency signal RF in series with a phase shift unit of $\pi/2$ 42. The interference between the two arms 34 and 36 makes it possible to obtain a signal at the radiofrequency $v_1+v_{RF}$.

By supplying each modulator 30, 32 with a radiofrequency signal at a specific frequency, at the output of each modulator 30, 32, a phased beam is obtained relative to a replica of the optical carrier that is frequency-shifted relative to the reference frequency of the specific frequency.

The emission beam-forming network 22 connects M first emission ports 44 to N second emission ports 46.

A beam-forming network is also referred to as an "Optical Beam-Forming Network".

Each first emission port 44 is respectively connected to one of the M optical beams generated by the emission light source 20.

Hereinafter, each first port is indexed by an integer k between 1 and M for emission and between 1 and M+1 for reception.

Each second emission port 46 can generate a control signal of one of the N elementary antennas 18.

Hereinafter, each second port is indexed by an integer h between 1 and N.

The emission beam-forming network 22 is for example an optically-implemented Blass matrix.

The transmission circuit 24 is able to ensure that each control signal is transmitted to a respective elementary antenna 18.

In the illustrated example, the transmission circuit 24 includes, after each second emission port 46, a combiner 48 with a replica of the optical carrier making it possible to obtain a combined signal.

In a variant, the combination is done using a multimodal interference combiner MMI.

The transmission circuit 24 next includes a fibered connection 50 to the N elementary antennas 18. This transmission circuit is able not to include variable delays between the N paths.

For each signal to be transported, the fibered connection 50 for example includes a first monomodal fiber 52 followed by a multicore fiber 54 and a second monomodal fiber 56. The first monomodal fiber 52 is connected to the output of the combiner 48, while the second monomodal fiber 56 is connected to a converter 58 supplying an elementary antenna 18.

The converter 58 makes it possible to convert an optical signal into a radiofrequency signal.

Each converter 58 includes at least one photodiode 60.

The optical reception device 16 is able to receive a signal coming from the phased antenna array 12.

An exemplary reception device 16 is in particular illustrated in FIG. 3.

The reception device 16 includes a light source 62 called reception light source 62, a collection circuit 64, a beam-forming network 66 called reception beam-forming network 66, a photodiode 68 and a controller, not shown.

The reception light source 62 is able to generate an optical carrier at a reference frequency and M optical beams. The M optical beams are phased relative to a replica of the optical carrier and frequency-shifted relative to the reference frequency.

According to the proposed example, the reception light source 62 includes two phase-locked lasers 70 and 72 (also called reception sub-sources). The laser 72 is able to generate the optical carrier at the frequency $v_2$. The laser 70 is able to generate the frequency $v_3$.

The collection circuit 64 is a collection circuit of the signals from the N elementary antennas 18.

The collection circuit 64 includes N paths 74 each connected to a respective elementary antenna 18, each path 74 including a converter 76, a modulator 78, a fibered connection 80, an optical filter 82 and another (phase) modulator 84.

Each modulator 78 is able to modulate at least one of the phase and the amplitude of an incident signal according to a modulation.

Each optical filter 82 is able to eliminate a side band.

The collection circuit 64 further includes two additional paths, one of the paths being supplied by the optical carrier and the other path supplying the reception light source 62 with a replica of the optical carrier to ensure that the M optical beams are phased relative to a replica of the optical carrier and frequency-shifted relative to the reference frequency.

More specifically, the reception light source 62 is arranged to generate M beams at $v_3+v_{RF,k}$.

The reception beam-forming network 66 connects (M+1) first reception ports 86 to N second reception ports 88.

Each second reception port 88 is connected to a respective path 74 of the N paths.

M first reception ports 90 of the (M+1) first reception ports 86 are respectively connected to one of the M optical beams.

The first reception port 86 not connected to one of the M optical beams is a control port 92.

The control port 92 is connected to the other reception ports 86 and 88 such that a maximum optical intensity on the control port 92 corresponds to phase signals on the N second reception ports 88.

The reception beam-forming network 66 is for example a Blass, or Butler, or Nolen matrix.

The photodiode 68 is connected to the control port 92 and is able to measure the optical intensity of the signal of the control port 92 at the reference frequency $v_2$.

The controller is able to control the modulation of each modulator 84 as a function of the optical intensity measured by the photodiode 68.

For example, to that end, the controller is able to implement a gradient descent algorithm technique.

In a variant, the controller is able to implement a Nelder-Mead algorithm technique.

According to another embodiment, the controller is able to implement a frequency marking technique.

In the proposed example, the receiving device 16 includes a first part 94 including the light source 62 and the photodiode 68 and a second part 96 including the receiving beam-forming network 66, the first part 94 being made from InP and the second part 96 being made from SiN.

In a variant, the second part 96 is made from silicon on insulator (SOI). By definition, a silicon-on-insulator structure is a structure made from a stack of a layer of silicon on a layer of insulator.

The operation of the antenna system 10 is disclosed hereinafter.

In emission mode, M+1 coherent optical beams are generated, the phase of which is locked using two lasers 26, 28. N radiofrequency signals are generated in order to modulate M optical beams in the carrier. The side beams are filtered and pass through the emission beam-forming network 22. The emission beam-forming network 22 makes it possible to obtain the phased optical distribution of the M channels.

By mixing the N outputs of the emission beam-forming network 22 with N respective replicas of the (M+1)-th optical beam used as local oscillator, two phenomena take place. On the one hand, there is a conversion of the optical phase distribution into radiofrequency phase distribution after the mixing. On the other hand, the frequency of the k-th channel after the mixing is given by $v_{RF,k}+v_1-v_0$.

In other words, these two phenomena correspond to the desired conversion functions into radiofrequency frequency in a heterodyne manner by increase and formation of the beam in the frequency domain.

More specifically, the optical field obtained at the output of the h-th second port in emission 46 can be expressed as follows:

$$E_h = E_0 \sum_{k=1}^{M} \alpha_{k,h} e^{i[2\pi v_k t + \varphi_{k,h}]} = E_0 \sum_{k=1}^{M} \alpha_{k,h} e^{i[2\pi(v_{RF,k}+v_1)t + \varphi_{k,h}]}$$

where $v_k = v_{RF,k} + v_1$, $\alpha_{k,h}$ and $\varphi_{k,h}$ are respectively the optical frequency of the channel k (between 1 and M) in 46, the amplitude and phase weights applied by the emission beam-forming network 22 applied to the optical fields of the first emission ports 44 assuming that the amplitude of the optical field $E_0$ is the same for each optical field.

The optical field obtained after the h-th combiner 48 and before entering the h-th photodiode 60, which supplies the h-th elementary antenna 18, can be expressed as follows:

$$E_{h,recomb} = E_0 \sum_{k=1}^{M} \left[\alpha_{k,h} e^{i[2\pi v_k(t-\tau_h)+\varphi_{k,h}]} + \alpha_0 e^{i[2\pi v_0(t-\tau_h)+\varphi_0]}\right] =$$

$$E_0 \sum_{k=1}^{M} \left[\alpha_{k,h} e^{i[2\pi(v_{RF,k}+v_1)(t-\tau_h)+\varphi_{k,h}]} + \alpha_0 e^{i[2\pi v_0(t-\tau_h)+\varphi_0]}\right]$$

where $\tau_h$ is the propagation time through the h-th channel, the propagation time is the propagation time between the h-th combiner 48 and the h-th photodiode 60.

The electrical signal after photodetection by the h-th photodiode 60 is expressed by:

$$i_{PD,h} = \eta |E_{h,recomb}|^2$$

As a result:

$$i_{PD,h} = i_{DC} + 2\alpha_0 I_0 \sum_{k=1}^{M} \alpha_{k,h} \cos[(2\pi(v_{RF,k}+v_1-v_0))(t-\tau_h)+\varphi_{k,h}-\varphi_0] +$$

$$2I_0 \sum_{k=1}^{M} \sum_{\substack{l=1 \\ l \neq k}}^{M} \alpha_{k,h} \alpha_{l,h} \cos[(2\pi(v_{RF,k}-v_{RF,l}))(t-\tau_h)+\varphi_{k,h}-\varphi_{l,h}]$$

This electrical signal contains:
a DC part $i_{DC}$,
a second term corresponding to the sum of all of the radiofrequency signals, weighted in phase and in amplitude by the emission beam-forming network 22. The radiofrequency signals that were found in the low-frequency domain are thus increased by a frequency value of $v_1-v_0$ that may reach several Gigahertz,
a third term corresponding to a stray term including the mixture of the radiofrequency sidebands.

The stray term can be eliminated by electrical filtering (before each elementary antenna 18), in particular in the typical case where $|v_0-v_{RF,k}| \gg |v_{RF,k}-v_{RF,l}|$, the elements making up the stray term then having a lower frequency than the radiofrequency signals that will supply the elementary antenna 18.

In reception, the antenna system 10 is similar to in emission with a frequency conversion process by decrease.

Furthermore, the antenna system 10 includes a channel specific to the carrier wave that makes it possible to compensate for the phase fluctuations caused by a fibered connection between the antenna with optical beam formation and the antenna array 12.

In the absence of compensation for the phase fluctuations, any phase shift causes a degradation of the beams obtained in the first ports of the optical beam-forming network.

The proposed antenna system 10 makes it possible, by an optical link, to transmit both the radiofrequency information of each channel and the control signals necessary to steer each radiofrequency beam in the desired direction. Since the control information can be modified dynamically, each channel direction is therefore dynamically adjustable. Given that the control signals are sent by a central control center, this antenna system 10 causes the control of the antenna array 12 to be placed at a fairly simple distance.

The ability to control the direction and the radiofrequency information content of each channel independently, namely the space-division multiplexing, allows the radars to track several targets and to obtain a greater effective bandwidth for telecommunications applications.

In the disclosed example, the shift by emission frequency increase depends on $v_1-v_0$, while on reception, the frequency shift by frequency decrease depends on $v_3-v_2$. Thus, the system works when $|v_1-v_0|=|v_3-v_2|$. This is achievable in several ways. In particular, the emission and reception circuit can share the same radiofrequency oscillator for the phase loop.

Other embodiments are conceivable.

For example, according to one embodiment, the light source can emit a frequency comb, each comb of which is separate to form one of the M beams.

In one specific case, the separation is done using an optical filter.

For example, the optical filter is a passive optical filter or a laser cavity.

In a variant, the light source includes (M+1) independent lasers.

According to one embodiment, the emission 20 and reception light sources can be based on the same lasers.

According to one embodiment, the frequency gap between the waves emitted by the emission light sources is identical to the frequency gap between the waves emitted by the reception light sources.

The invention claimed is:
1. An optical reception device, the optical reception device receiving a signal from a phased antenna array, the phased antenna array including N elementary antennas, each elementary antenna emitting a signal, each signal having a phase and an amplitude, N being an integer greater than 1, the reception device including:
a light source generating an optical carrier at a reference frequency and M phased optical beams relative to a replica of the optical carrier and which are frequency-shifted relative to the reference frequency, M being an integer greater than 1,
a collection circuit for the signals from the N elementary antennas, the collection circuit including N paths each connected to a respective elementary antenna, each path including a modulator modulating at least one of the phase and the amplitude of an incident signal according to a modulation, a beam-forming network connecting M+1 first ports to N second ports, each second ports being connected to a respective path of the N paths, the M+1 first ports comprising:
M first ports being connected respectively to one of the M phased optical beams, and
a first port not connected to one of the M phased optical beams, the first port being a control port, the control port being connected to the M first ports so that a maximum optical intensity on the control port corresponds to phased signals on the N second ports, a photodiode connected to the control port and measuring an optical intensity of a signal of the control port at the reference frequency, and a controller controlling the modulation of each modulator as a function of the optical intensity measured by the photodiode.

2. The optical reception device according to claim 1, wherein the collection circuit includes two additional paths in addition to the N paths, one of the additional paths being supplied by the optical carrier and the other path of the additional paths supplying the light source with a replica of the optical carrier.

3. The optical reception device according to claim 1, wherein the controller controls the modulation of each modulator as a function of the optical intensity measured by the photodiode using a technique chosen from a group made up of a gradient descent algorithm, a Nelder-Mead algorithm, and a frequency marking technique.

4. The optical reception device according to claim 1, wherein the beam-forming network is a Blass, or Butler, or Nolen matrix.

5. The optical reception device according to claim 1, wherein the collection circuit includes multi-core fibers.

6. The optical reception device according to claim 1, wherein each path of the collection circuit includes an optical filter eliminating a sideband.

7. The optical reception device according to claim 1, wherein the light source includes two phase-locked lasers.

8. The optical reception device according to claim 1, wherein the optical reception device includes a first part including the light source and the photodiode and a second part including the beam-forming network, the first part being made from Indium Phosphide (InP) and the second part being made from Silicon Nitride (SiN) or sub strate-on-insulator.

9. An antenna system including:
an optical reception device according to claim 1, and
a phased antenna array, the phased antenna array including the N elementary antennas.

10. The antenna system according to claim 9, the antenna system further including an optical emission device for controlling the phased antenna array, the emission device including:
a light source generating an optical carrier at a reference frequency and M phased optical beams relative to a replica of the optical carrier and which are frequency-shifted relative to the reference frequency, and
a beam-forming network connecting M first ports to the N second ports, each first port respectively being connected to one of the M optical beams generated by the light source and each second port generating a control signal of one of the N elementary antennas.

11. The antenna system according to claim 10, wherein the light source of the emission device comprises two emission sub-sources each emitting a light wave with a first frequency gap, the light source of the reception device comprising two reception sub-sources each emitting a light wave with a second frequency gap, the first and the second frequency gaps being identical.

* * * * *